July 17, 1923.
J. TOTH
BEEHIVE
Filed April 1, 1922
1,461,950
2 Sheets-Sheet 1
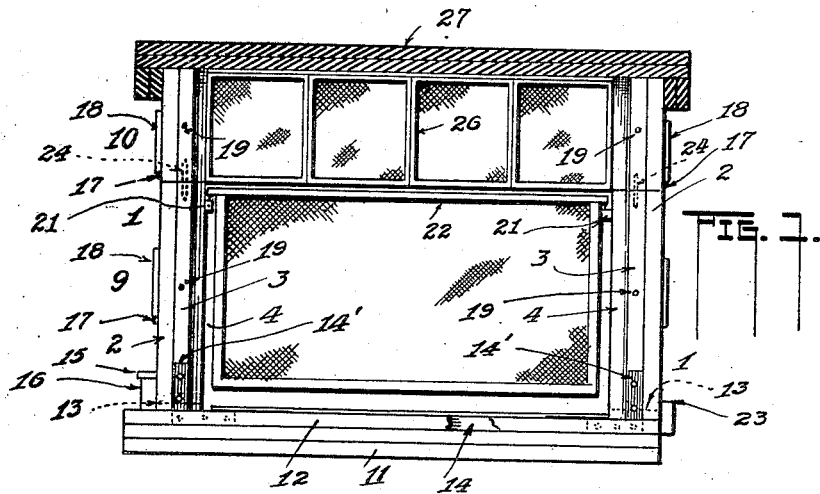
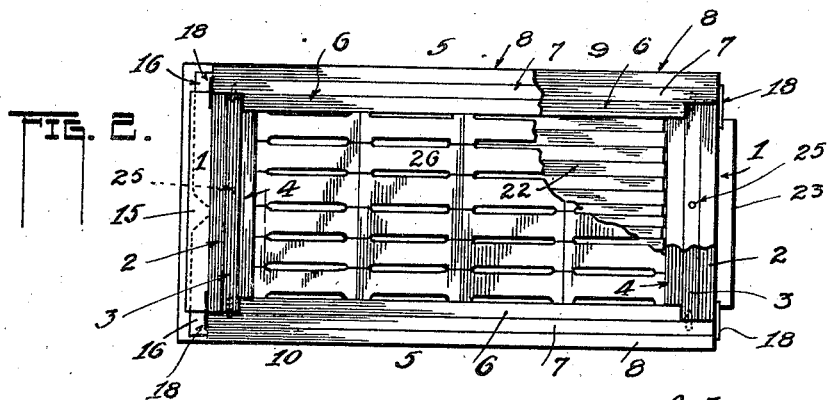
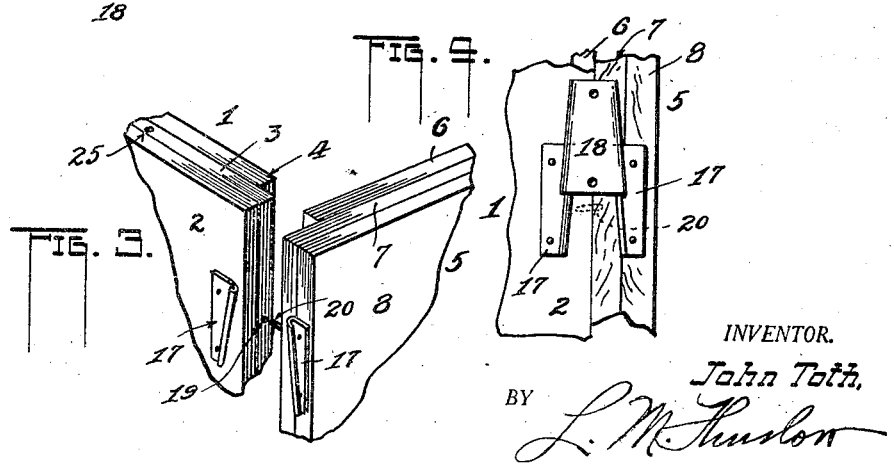
INVENTOR.
John Toth,
BY
L. M. Thurlow
ATTORNEY.

July 17, 1923.
J. TOTH
BEEHIVE
Filed April 1, 1922
1,461,950
2 Sheets-Sheet 2
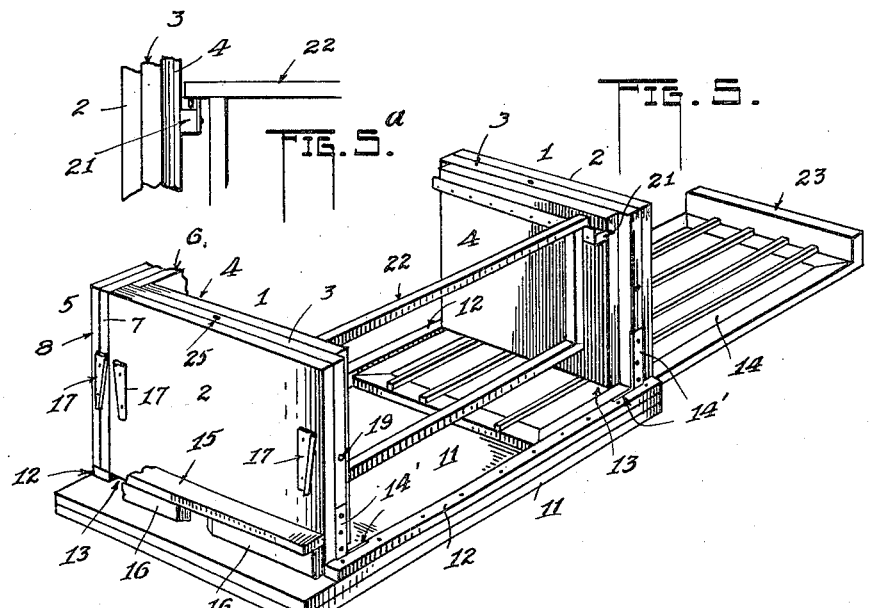
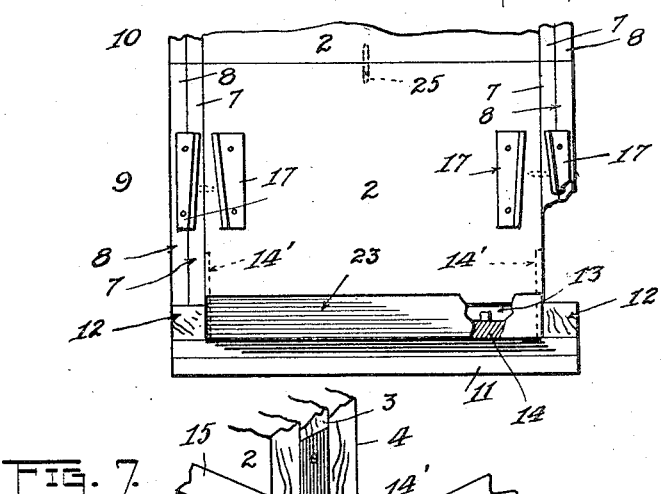
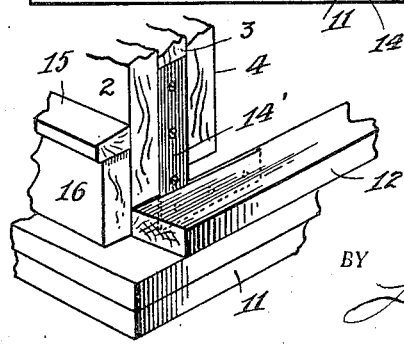
INVENTOR.
John Toth,
BY
L. M. Thurlow
ATTORNEY.

Patented July 17, 1923.

1,461,950

UNITED STATES PATENT OFFICE.

JOHN TOTH, OF BARTONVILLE, ILLINOIS.

BEEHIVE.

Application filed April 1, 1922. Serial No. 548,599.

*To all whom it may concern:*

Be it known that I, JOHN TOTH, citizen of the United States, residing at Bartonville, in the county of Peoria and State of Illinois, have invented new and useful Improvements in Beehives; and I do hereby declare that the following is a full, clear, and exact description of the invention, which will enable others skilled in the art to which it appertains to make and use the same.

This invention relates to improvements in bee hives, pertaining particularly to the construction of a hive whereby the removal of honey therefrom may be made quite easy and altogether safe even for novices, and that in opening the hive there will be no danger of destroying the bees as results in the use of hives as commonly made.

An object of the invention, therefore, is the construction of a hive that will permit the sides thereof to be removed to the end that the frames bearing the honey may be separated in a lateral direction from one another and removed from the thus open side of the structure instead of lifting them vertically in their own planes from the top.

Another object is to construct a hive having rigidly supported or fixed opposite end walls and side walls that may be secured in position thereon but which may be removed at will without disturbing the other parts of the structure.

Still another object is that of providing removable sides for the usual brood chamber and for the upper or "super" section of the end that the sides of either may be removed without reference to those of the other.

A further object is the provision of a new feeder board arrangement which does not require moving of the hive in order to make use thereof as is required under the present day structures.

To the end that my invention may be readily understood I have provided the accompanying drawings, forming part hereof, wherein—

Figure 1 is a side elevation of my improved hive, its side having been removed to show the structure of the parts.

Figure 2 is a plan of the hive, the top or cover having been removed.

Figure 3 shows portions of a side and end structure in perspective.

Figure 4 is an elevation of part of one end of the hive showing a portion of one end of a side portion and means for securing them together.

Figure 5 shows, in perspective, the brood chamber section of my inproved hive with one of the sides removed and a portion of the other in place, and also showing a feeder board.

Figure 5ª is a detail of a brood frame supporting means.

Figure 6 is a rear-end elevation of part of the hive showing the end of a feeder board, and Figure 7 shows, in perspective, a detail of the mounting of the end of the brood section upon the bottom or base of the hive.

The sides of the hive are preferably laminated, being made up of three thicknesses of wood placed grain across grain, That is to say, the end portions designated each as a whole by the character 1 are shown made up of three thicknesses or layers 2, 3 and 4, while the sides, denoted at 5, have the three thicknesses 6, 7 and 8, this being true of both the lower or brood section 9 and the upper or commonly designated "super" 10.

The bottom or base is represented at 11, a strip 12 secured upon its top surface at each of its longest edges as clearly shown in Figures 5 and 6.

The described ends 1 are of a length equal to the distance between said strips 12 and their lower edges are substantially flush with the tops of the same leaving a space 13 beneath for the entrance of the bees at the front end of the hive and for the introduction of a feeder board 14 at the other or rear end.

The extensions of an L-shaped brace 14' are let in the end surfaces of said ends 1 of the brood section and into the inner sides of the strips 12, as clearly shown in Figure 7, and are secured to each in suitable manner the ends being thus rigidly held in upright position.

Secured upon the outer surface of the front end is a ledge 15, Figure 7, beneath which are two strips 16 forming closures for the space 13 the separation of said strips giving entrance for the bees.

The innermost boards 4 of the ends 1 are slightly shorter than the two outer ones 2, 3 as shown for a purpose now to be described. That is to say, the two outer boards 7, 8 of the sides 5 overlie the vertical edges of the ends, while the inner or third boards 6 are of a length only to fit between the boards 3 of said ends and that lie against the ends of the boards 4.

The structure as may be seen provides a joint that will exclude cold and make a very substantial arrangement, being alike as to both the brood section and said "super" section.

To secure the sides and ends relatively I preferably employ a pair of flanged plates 17, one being attached near each end of said end portions of both sections, one also being secured to each end of each side member. These plates are thus disposed in pairs as shown and their flanges which are opposite one another lie at angle to one another receiving upon them a plate 18, Figure 4, acting after the manner of a wedge to closely clamp the sides and ends together.

In addition a hole 19 is bored in the edges of the ends 1 and each receives a dowel-pin 20 in the sides 5, Figures 3 and 4, as a further aid to rigidity of the parts.

Secured upon the inner side of each of the ends 1 near their tops is a horizontal slat 21 upon and between which is suspended the usual series of brood-frames 22 shown in Figure 2, but one of them being illustrated in Figure 5.

A feeder board 14 previously referred to is shown in Figures 1, 5 and 6, it rests upon the bottom 11 being guided between the strips 12, and said board is provided with a member 23 at one end which forms a closure for the space 13, Figure 6.

When the board is pushed entirely within the hive, closing said opening, its forward end is spaced sufficiently from the space 13 at the forward end 1 to permit free passage of the bees.

This arrangement provides for withdrawing the board for supplying it with food for the bees in the early spring as is required in bee raising, and also in order that dead bees may be removed readily, as distinguished from common practice, which, by the methods in vogue, requires that the hive be shifted in position to enable the keeper to place in position or remove the feeder portion.

The "super", constructed in all respects the same as the brood section, is secured in place upon the latter by dowels 24, Figure 1, which enter holes 25 in the tops of the ends 1, Figures 2 and 5.

The frames 26 for the storage of honey are positioned in the "super" upon any usual supporting means and a lid or cover 27 surmounts the "super" as shown.

In the common type of hive whose parts are nailed or screwed together permanently the only manner of reaching the interior is to remove the lid or cover which is very disturbing to the bees and often leads to serious results, and only experienced bee keepers will attempt entrance in this manner.

Again, in order to remove the brood frames they must be raised vertically in their own planes one by one with the result, as must be clear, that bees will be caught between the frames and destroyed in considerable numbers.

It is often required, also, to gain possession of the queen of the colony and in order to do so the "super" section must be removed and the brood frames removed at the expense of great labor and much time in order to do so under the old method. My improved hive provides for the easy removal of the frames 26 and the brood frames without any inconvenience, disturbance to the bees, or loss of time, by the simple removal of one of or both of the sides of the section whose interior it is desired to reach.

The separation of the plate 18 from the plates 17, or other fastening means that may be used, at once permits removing the desired side portion and the replacing of said plate serves to quickly lock the parts together.

The upper and lower sections may be opened separately, of course, the lid or cover of the former being first raised sufficiently to permit the plate 18 of that section to be removed. Besides being enabled to readily remove the frames 26 and brood frames from the side it is often desired to reach the queen of the hive which is usually found upon one or the other of the outermost brood-frames or that lying nearest one of the sides 5. Therefore, by the simple removal of either of the latter the queen can be readily caught as distinguished from the necessity, usually of disturbing the whole hive and contents.

It is to be understood that fastening means other than that shown and described may be used, however, since I do not wish to limit myself in that respect.

Besides being enabled to reach the interior of the hive thus readily and safely the matter of shipping in "knock-down" form is an advantage coupled with the ability of the buyer to assemble the parts of the hive in a few moments. Securing the ends 1 in position on the base is really the only mechanical work to be done, the balance of the operation merely involving setting the other parts in position.

The feeder board 14 is a novel feature in a hive in that it can be removed and replaced readily without in any way disturbing the hive or its occupants and yet makes a tight closure at the rear space 13 through the use of the member 23 thereof.

I claim:

1. A bee hive including in its construction a lower section comprising a base, a pair of walls erected thereon spaced from one another in parallel planes, a support for each wall for maintaining it in fixed position and spacing it above the base, each wall at its vertical edges being rabbeted, the rabbets being on the surfaces of said walls that face one another, other walls abutting at their ends upon the first named walls, the second named walls also being rabbeted to fit the rabbets of the said first named walls to form a cold tight joint, means to secure the walls is position but permit their quick removal, an upper section comprising walls likewise rabbeted separable from one another adapted to rest upon the walls of the lower section, means to secure the walls of said upper section against lateral displacement with respect to the walls of said lower section, the enclosed space of the upper section communicating with that of the lower section, and a closure for the upper section constituting a covering for the entire hive.

2. A bee hive including in its construction a base, end walls spaced from one another, supports for said walls maintaining them in permanent upright position in spaced relation to said base, said end walls being rabbeted at their upright edges each on its inner surface, and side walls rabbeted at their ends, the two series of walls adapted to abut and each receiving the other into the rabbet thereof, a feeder-board slidable beneath one of the end walls, and a guide at each side edge of the base, the guides adapted to receive between them the said feeder-board, the said side walls adapted to rest upon said guides.

In testimony whereof I affix my signature in presence of two witnesses.

JOHN TOTH.

Witnesses:
 JUDSON STARR,
 L. M. THURLON.